United States Patent
Dobbs et al.

(10) Patent No.: US 9,057,392 B2
(45) Date of Patent: Jun. 16, 2015

(54) WEB-HANDLING MACHINE FRAME

(75) Inventors: James N. Dobbs, Woodbury, MN (US); Ronald P. Swanson, Woodbury, MN (US); Daniel H. Carlson, Arden Hills, MN (US); Larry D. Humlicek, Woodbury, MN (US); John T. Strand, Stillwater, MN (US); Daniel J. Theis, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/235,559

(22) PCT Filed: Aug. 29, 2012

(86) PCT No.: PCT/US2012/052742
§ 371 (c)(1),
(2), (4) Date: Jan. 28, 2014

(87) PCT Pub. No.: WO2013/033130
PCT Pub. Date: Mar. 7, 2013

(65) Prior Publication Data
US 2014/0161511 A1    Jun. 12, 2014

Related U.S. Application Data

(60) Provisional application No. 61/530,579, filed on Sep. 2, 2011.

(51) Int. Cl.
*F16B 5/00* (2006.01)
*B41F 13/00* (2006.01)
(Continued)

(52) U.S. Cl.
CPC ............. *F16B 5/0004* (2013.01); *Y10T 403/20* (2015.01); *B41F 13/0024* (2013.01); *B41J 29/02* (2013.01);
(Continued)

(58) Field of Classification Search
CPC ............. B65H 49/38; B65H 2701/534; B65H 18/021; B65H 18/028; B65H 2402/11; B65H 2402/40; B65H 2511/23; B41J 29/02; B41J 29/026; F16B 5/0004; Y10T 403/20; B41F 13/0024
USPC ............... 52/581, 588.1, 582.1, 582.2, 586.1, 52/586.2, 585.1, 590.1, 591.1, 590.2, 52/590.3, 592.2, 592.3, 562, 564, 606, 52/607; 445/108, 115, 122, 123; 101/479, 101/480; 242/594, 594.3–594.6
See application file for complete search history.

(56) References Cited

U.S. PATENT DOCUMENTS

| 4,161,068 A | 7/1979 | McMaster |
|---|---|---|
| 4,299,067 A | 11/1981 | Bertschi |

(Continued)

FOREIGN PATENT DOCUMENTS

| JP | 11-236919 | 8/1999 |
|---|---|---|
| WO | 2008/109303 | 9/2008 |
| WO | 2013/033130 | 3/2013 |

OTHER PUBLICATIONS

PCT International Search Report, PCT/US2012/052742, dated Feb. 15, 2013, 3 pages.

(Continued)

*Primary Examiner* — Ryan Kwiecinski
*Assistant Examiner* — Alp Akbasli
(74) *Attorney, Agent, or Firm* — Adrian L. Pishko

(57) ABSTRACT

A web-handling machine frame, at least partially built from reconfigurable interconnected blocks having precision alignment points. From such blocks, modular equipment web-handling lines for web-handling operations can be constructed ad hoc with their shaft mounted web-contacting devices in tram without the need for separate alignment procedures.

23 Claims, 4 Drawing Sheets

(51) Int. Cl.
  *B41J 29/02* (2006.01)
  *B65H 49/38* (2006.01)
  *B65H 18/02* (2006.01)

(52) U.S. Cl.
  CPC .............. *B41J 29/026* (2013.01); *B65H 49/38* (2013.01); *B65H 2701/534* (2013.01); *B65H 18/021* (2013.01); *B65H 18/028* (2013.01); *B65H 2402/11* (2013.01); *B65H 2402/40* (2013.01); *B65H 2511/23* (2013.01)

(56) References Cited

U.S. PATENT DOCUMENTS

| | | | | |
|---|---|---|---|---|
| 5,271,204 | A * | 12/1993 | Wolf et al. | 52/836 |
| 5,598,985 | A | 2/1997 | Winesett | |
| 6,000,186 | A * | 12/1999 | Fielding et al. | 52/564 |
| 6,086,258 | A | 7/2000 | Cadle | |
| 6,105,899 | A | 8/2000 | Harris | |
| 6,148,585 | A * | 11/2000 | Baker | 52/834 |
| 6,450,853 | B1 * | 9/2002 | Larws | 446/93 |
| 6,511,073 | B2 * | 1/2003 | Simonds | 273/299 |
| 6,592,421 | B1 * | 7/2003 | Clever | 446/108 |
| 6,676,474 | B2 | 1/2004 | Glickman | |
| 6,742,311 | B2 | 6/2004 | Fortier | |
| 6,764,245 | B2 | 7/2004 | Popoyski | |
| 7,267,598 | B2 | 9/2007 | Glickman | |
| 7,296,717 | B2 | 11/2007 | Swanson | |
| 7,481,692 | B2 * | 1/2009 | Bruder | 446/122 |
| D597,149 | S * | 7/2009 | Sinisi et al. | D21/484 |
| 7,621,091 | B2 * | 11/2009 | Dickey et al. | 52/582.2 |
| 7,882,667 | B2 * | 2/2011 | Smith | 52/282.3 |
| 8,429,871 | B2 * | 4/2013 | Ingjaldsdottir et al. | 52/582.1 |
| 8,464,476 | B2 * | 6/2013 | Roberts | 52/80.1 |
| 8,464,488 | B2 * | 6/2013 | Pelc, Jr. | 52/586.1 |
| 8,602,180 | B2 * | 12/2013 | Centeno et al. | 188/229.1 |
| 8,671,640 | B1 * | 3/2014 | Thomas | 52/586.2 |
| 2002/0153093 | A1 | 10/2002 | Cook | |
| 2006/0107612 | A1 | 5/2006 | Pelc | |
| 2007/0175158 | A1 | 8/2007 | Cope | |

OTHER PUBLICATIONS

Good, et al., "Buckling of Orthotropic Webs in Process Machinery," Proceedings of the Seventh International Conference on Web Handling, pp. 133-149, 2003.

Nigam, et al., "Review of Statistical Approaches to Tolerance Analysis," Computer-Aided Design, vol. 27, No. 1, pp. 6-15, 1995.

Supplementary European Search Report, EP Application No. 12826793, dated Mar. 20, 2015, 3 pages.

* cited by examiner

WEB-HANDLING MACHINE FRAME

CROSS REFERENCE TO RELATED APPLICATIONS

This application is a national stage filing under 35 U.S.C. 371 of PCT/US2012/052742, filed Aug. 29, 2012, which claims priority to Provisional Application No. 61/530,579, filed Sep. 2, 2011, the disclosure of which is incorporated by reference in its/their entirety herein.

The present invention is related to an apparatus for manipulating a web of material having indefinite length.

BACKGROUND

Today many products include a manufacturing step where a web of indefinite length material is changed in some fashion while being conveyed between an unwind station and one or more wind-up stations. These are sometimes called "roll-to-roll" processes. Between the unwind and the wind-up, the web is conveyed along a web path, the web path usually including driven and/or idler rollers. There are numerous processes that can be undertaken to convert the web while it is being conveyed along a web path, including coating, printing, laminating, slitting, and many others.

SUMMARY

A difficulty in carrying out roll-to-roll processes is avoiding wrinkles, folds and other web disruptions while the web is being conveyed. The moving web endures frictional contact when it passes over a roller, and wants to align itself to the moving surface of the roller. It is understood that parallelism between web contacting rollers is important for minimizing wrinkles and other defects as the web is conveyed. Rollers with a high degree of parallelism between their respective axes are said by those of skill in the art to be "in tram and level."

Because of this need some roller mounts are made to be adjustable, and elaborate optical, laser, mechanical, or inertial equipment are commonly used to set up web-contacting devices such as rollers with high degrees of parallelism. Once an entire web line has been placed in tram and level, sometimes tapered pins are used to secure the adjustable mounts into position.

A discussion of the mechanics of moving webs is present in, "Buckling of Orthotropic Webs in Process Machinery;" J. K. Good, J. A. Beisel; *Proceedings of the Seventh International Conference on Web Handling*, pp 133-149 2003. Using the mathematical techniques therein, an analysis of a selection of web materials with a range of thicknesses, widths, and web span lengths was carried out to determine the degree of roller parallelism needed to avoid wrinkles. It was determined that roller parallelism to about 0.004 radian is required to handle many common web-handling situations, and parallelism within 0.0005 radian or even within 0.0001 radian, is needed for certain demanding applications such as handling thin metal foil material. The need for such precision makes difficult and expensive setting up a short production run or an experimental apparatus.

It has now been determined that modular equipment can be fabricated such that web-handling lines for converting operations can be constructed ad hoc with their web-contacting devices (such as rollers) in tram and level without the need for separate alignment procedures. The modular equipment is constructed from small component modules in the form of reconfigurable blocks that can be stacked and assembled in a variety of configurations to suit the particular requirements of an experiment or short production run. When the shafts of shaft-mounted web-contacting devices are disposed within certain precision alignment points on the blocks, the web-contacting devices are consistently in tram and level without further adjustment.

One or more advantages are associated with embodiments of the invention. The modular nature of the reconfigurable blocks allows temporary set-ups to be constructed for specialty manufacture or experimental runs. Since the precision alignment points are in fixed positions on the reconfigurable blocks, shaft-mounted web-contacting devices can be mounted quickly and directly without needing adjustment. Further, the time and expensive ancillary equipment involved in placing conventional web-contacting elements in tram is avoided.

Hence, in one aspect, the invention resides in a web-handling machine frame, comprising: at least two reconfigurable interconnected blocks, and each reconfigurable interconnected block comprising at least three sides and two faces, and at least one bore within at least one of the faces; at least two sides of each reconfigurable interconnected block having a precision alignment point; the precision alignment point comprising an aperture connecting the alignment point to the bore; and at least one shaft, the shaft being disposed within and releasably attached to one of the precision alignment points of each of the two reconfigurable interconnected blocks.

In a second aspect, the invention resides in a web-handling machine frame comprising: at least two reconfigurable interconnected blocks wherein each reconfigurable interconnected block has at least two precision alignment points; and at least two shaft-mounted web-contacting devices each having an axis of rotation; and when the shafts of the web-contacting devices are positioned in the precision alignment points of each reconfigurable interconnected block, the web-contacting devices are in tram and level to within 0.004 radian.

In any of the embodiments, the positioning of at least some of the precision alignment points, both on a given reconfigurable block and on an assembly built up from a number of reconfigurable blocks, allows axes of shafts disposed within the precision alignment points to be at the vertexes of a regularly spaced grid associated with a plane. That plane is conveniently parallel to one of the faces of the reconfigurable blocks. In some embodiments, the grid will be rectilinear with two perpendicular axes, with the vertexes spaced a predetermined distance apart, or a multiple of that predetermined distance, conveniently in both of the perpendicular axes. The predetermined distance can be conveniently 3 inches (7.62 cm), although values such as 1, 2, 3, 4, and 5 or more inches, or any values in between can be used or predetermined distances and spacing in any convenient unit can be selected such as centimeters.

In any of the embodiments, when a second shaft is disposed within and releasably attached to a second one of the precision alignment points, the two shafts are in tram and level without needing further adjustment. With properly constructed blocks, a web-handling machine frame, or a module forming a portion thereof, can be built up from numerous blocks, e.g. between about 2 to 500 or more, or between 10 and 100 interconnected blocks, and support the shafts of several web-contacting devices such as 2, 3, 4, 5, 6 or more, all of which are in tram and level without further adjustment.

An analysis of stacking using the Root Sum of Squares (RSS) method indicates that a spacing accuracy of precision alignment points to within ±50 microns would maintain parallelism between shafts to within 0.004 radians throughout a machine frame having dimensions up to 760 inches or more on a side. A spacing of precision alignment points accurate to within ±5 microns would maintain parallelism between shafts to within 0.0001 radians throughout a machine frame having dimensions of up to 50 inches or more on a side. This more restrictive alignment criterion could encompass a machine built up from 200 or more modular interconnected blocks. Thus, in any of the embodiments, the spacing accuracy of the precision alignment points can be within ±50 microns, ±25 microns, ±10 microns, ±5 microns, or even ±2.5 microns. In any of the embodiments, it is desirable if the web-contacting devices are in tram and level to within 0.004 radian, within 0.001 radian, within 0.0005 radian, within 0.00025 radian, or within 0.0001 radian. A further discussion of the RSS method may be found in "Review of Statistical Approaches to Tolerance Analysis;" S. D. Nigam, J. U. Turner; *Computer-Aided Design*, Vol. 27, No 1, pp. 6-15, 1995.

Unless expressly defined herein, the terminology used to describe the embodiments of the invention will be understood to have the same meaning attributed to them by those skilled in the art. In particular, as used herein, "shaft-mounted, web-contacting devices" include but are not limited to driven and idler rollers, rolling encoders, printing rollers, embossing rollers, laminating nips, heat transfer rollers, slitter rollers, spreading rollers or spreading bars, steering rollers and microflexo rollers. Further, the definition of "shaft-mounted, web-contacting devices" is not limited to devices having a single through shaft, but also to devices having partial shafts or having spherical or toroidal mounts. Also included in the definition are live shaft rollers supported by bearings disposed within the precision alignments points. Also included in the definition are non-rotating elements that are disposed to intentionally contact the moving web as it transverses along a web path in a converting machine or other web handling machine. Similarly, non-contacting elements, such as dryers, non-contacting sensors or other devices could be supported by shafts disposed within the precision alignments and positioned very accurately adjacent to the moving web.

Those skilled in the art will more fully understand the nature of the invention upon consideration of the remainder of the disclosure, including the Detailed Description, the Examples, and the appended claims.

BRIEF DESCRIPTION OF THE DRAWINGS

In describing the embodiments of the invention, reference is made to the various Figures in which the features of the depicted embodiments are identified with reference numeral with like reference numerals indicating like structures and wherein.

DETAILED DESCRIPTION

Figure 1:
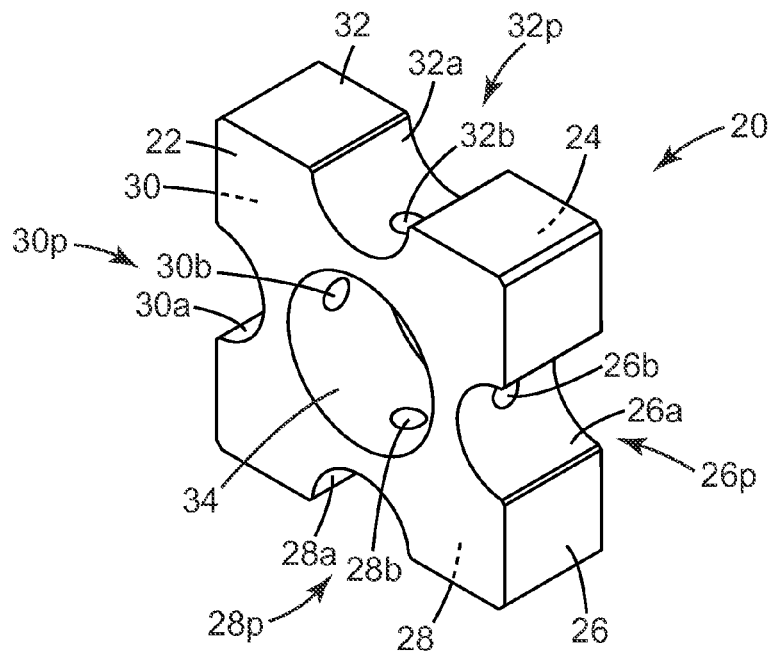
FIG. 1 is a perspective view of an embodiment of one of the reconfigurable blocks used to form a web-handling machine frame according to the present invention.
Figure 7:
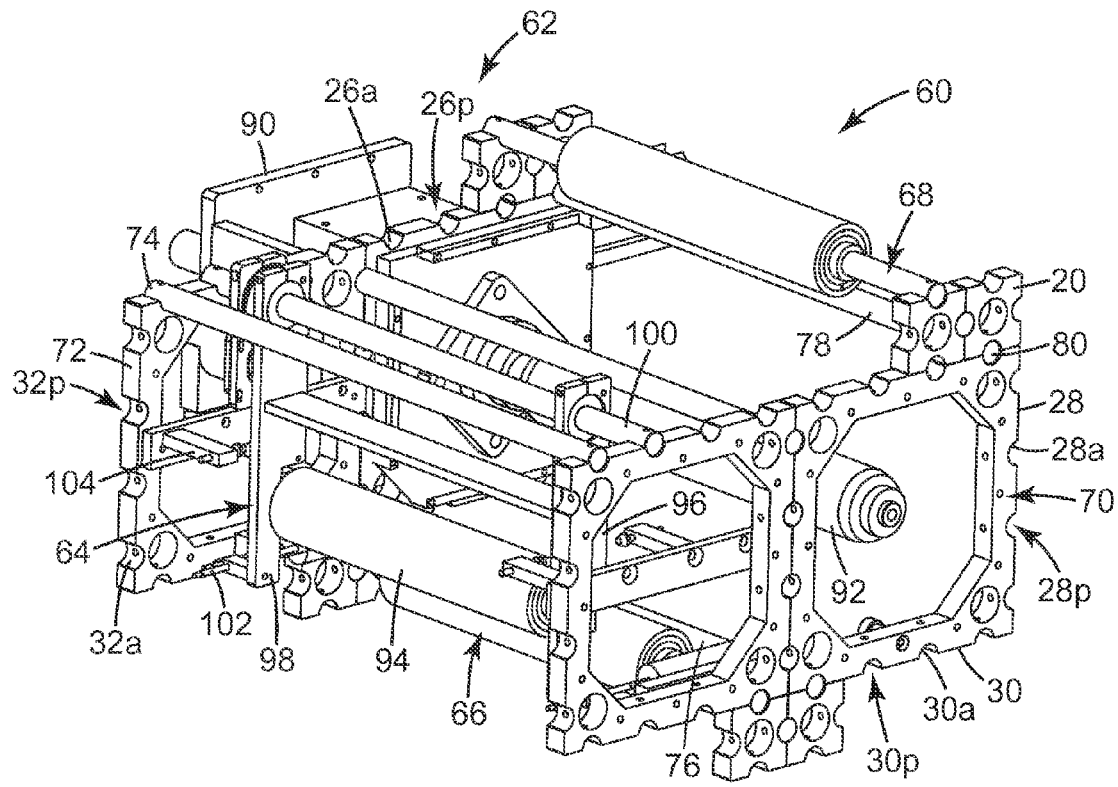
FIG. 7 is a perspective view of a web-handling station.

Referring now to FIG. 1, a perspective view of a reconfigurable block 20 is illustrated. The reconfigurable block 20 has two faces 22 and 24, and in this embodiment four sides 26, 28, 30 and 32. The depicted block is constructed generally as a right parallelepiped, but the artisan will readily perceive that the invention is workable with blocks with faces of other shapes such as rectangles, parallelograms, triangles or hexagons, as will be discussed below in connection with FIGS. 3, 4, and 5. At least one bore 34 is present in face 22, and in this embodiment the bore 34 is a through bore that extends all the way to face 24, but reconfigurable blocks 20 having blind-end bores are also suitable. In some embodiments, the bore can be quite large and not necessarily round and could be described alternatively as an opening when more than one precision alignment point is present on a side as shown in FIG. 7. As seen, some of the precision alignment points have an aperture that connects with the small circular bore and others have an aperture that connects with the large central opening.

In the depicted embodiment, all four sides 26, 28, 30 and 32 have a precision alignment point 26p, 28p, 30p and 32p respectively. Each of the depicted precision alignment points is partially defined by a groove 26a, 28a, 30a and 32a respectively, each having a truncated half-round shape. Each alignment point further includes an aperture 26b, 28b, 30b and 32b respectively that can be conveniently positioned at the center of the groove 26a, 28a, 30a and 32a respectively approximately halfway between the faces 22 and 24. These apertures 26b, 28b, 30b and 32b connect their respective alignment point 26p, 28p, 30p and 32p respectively, to the bore 34.

In some embodiments, only a single precision alignment point is present on at least two sides of the reconfigurable block. In other embodiments, only a single precision alignment point is present on each side of the reconfigurable block. In other embodiments, at least one side of the reconfigurable block has at least 2 precision alignment points, at least 3 precision alignment points, at least 4 precision alignment points, or at least 5 or more precision alignment points. The number of precision alignment points located on a side is not limited and can be readily selected based on the overall size of the block and the selected spacing of the precision alignment points chosen.

Reconfigurable blocks according to the present disclosure are conveniently made of suitable structural materials such as ceramic, polymer or metal. When a metal is used, stainless steel or aluminum is conveniently employed. More particularly 7075 T6 aluminum is perceived to be suitable. When aluminum is used, a hard coat anodizing treatment may be advantageous.

Figure 2:
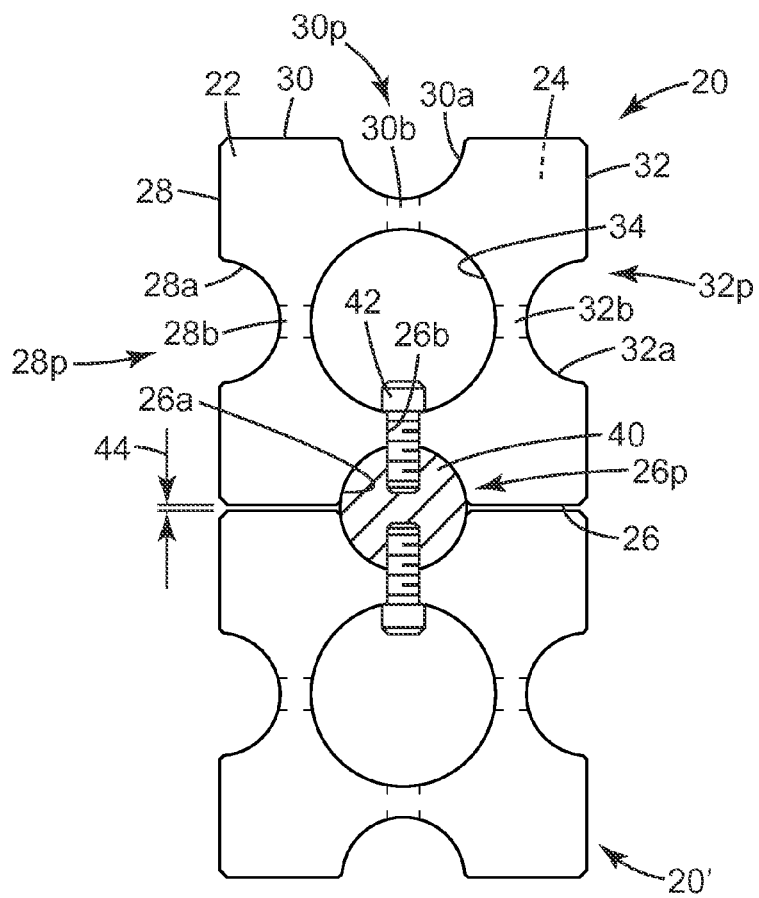
FIG. 2 is a side view of two reconfigurable blocks having a square face, bound together.

Referring now to FIG. 2, a side view of two reconfigurable blocks 20 and 20' according to FIG. 1 are illustrated bound together via a shaft 40. The shaft 40 is held in the groove 26a via, e.g. a bolt 42 disposed within aperture 26b and threaded into the shaft 40. In this embodiment the grooves, e.g. 26a, have a truncated half-round shape. Conveniently, the grooves 26a are truncated 0.01 inch (0.25 mm) from being completely half-round in cross section. The shaft is precision ground to a radius equal to the radius of the groove and with a similar tolerance. The shaft 42 can be the supporting shaft of shaft-mounted web-contacting device, or it can be a very short shaft with no other purpose than binding reconfigurable blocks 20 and 20' together.

Because the groove 26a is not a complete semi-circle, the sides of the two reconfigurable blocks 20 and 20' are separated by a gap 44. The gap is conveniently approximately 0.02 inch (0.5 mm), but this is not a critical dimension as long as it is large enough to avoid over constraining the position of the precision alignment points. In this embodiment, the accuracy of the relative placement of the two reconfigurable blocks 20 and 20' is contingent upon the accuracy of the spacing of the grooves, e.g. 26a and the accuracy of the diameter of the shaft. An advantage realized from this approach is that wear and tear to the sides, e.g. 26, of the reconfigurable block 20 when being reused numerous times does not ruin the accuracy of the relative placement. Further, it allows a given reconfigurable block 20 to be easily removed from an assembled field of numerous reconfigurable blocks when desired. Because of the gaps between each of the reconfigurable blocks, less disassembly of the web-handling machine frame is required to significantly change the resulting web path when inserting or removing shaft-mounted web-contacting devices.

While most shaft-mounted web-contacting devices used in web-handling have round shafts, and the illustrated embodiment in FIG. 2 and elsewhere have round shafts, this is not considered a requirement of the invention. For example, shaft-mounted web-contacting devices could be manufactured with square or triangular shafts, and precision alignment points with square or triangular grooves could be fabricated to receive them. Additionally, triangular or V-shaped grooves could be sized to center and align rounds shafts of web-contacting devices if desired.

Figure 2A:
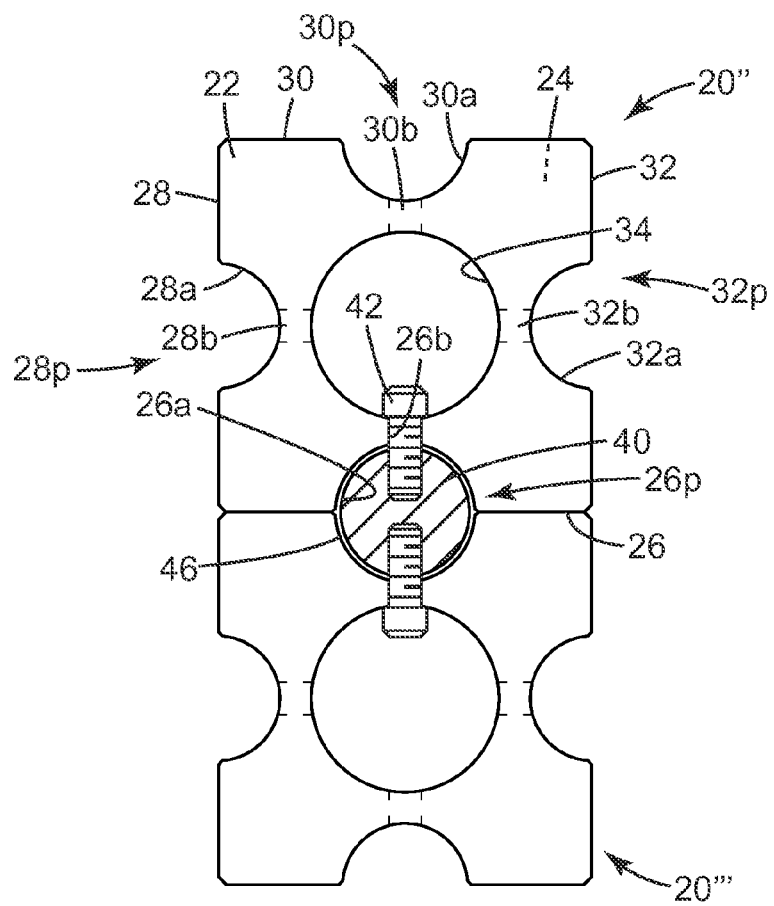
FIG. 2a is a side view of two alternative reconfigurable blocks having a square face, bound together.

Referring now to FIG. 2a, a side view of two reconfigurable blocks 20" and 20''' illustrated. This view is similar to FIG. 2 in that the two reconfigurable blocks 20" and 20''' are bound together via a shaft 40 which is held in the groove 26a via a bolt 42 disposed within aperture 26b. However, in this embodiment the grooves, e.g. 26a, have a fully half-round shape, the shaft 40 has a diameter smaller than the groove 26a, and the shaft need not necessarily be precision ground, but should mate with the grooves, e.g. 26a in a sliding fit.

With the described configuration, the sides of the two reconfigurable blocks 20" and 20''' are in contact with each other and, the shaft 40 is separated from the walls of the grooves, e.g. 26a, by a gap 46 (the gap chosen can be a sliding fit for a given shaft size can be calculated from ANSI standard B4.2-1978). In this embodiment, the sides, e.g. 26 of the blocks 20" and 20''' are in contact, and the accuracy of the relative placement of the two reconfigurable blocks 20" and 20''' is contingent upon the accuracy of the placement of the sides, e.g. 26 of the blocks 20" and 20'''. An advantage realized from this approach is that the dimensional accuracy of the grinding of the shaft 40 is not as critical insofar that the gap 46 does not result in a misalignment of the shaft 40 greater than an angle of 0.004 radians or even 0.0001 radians for demanding applications.

Figure 3:
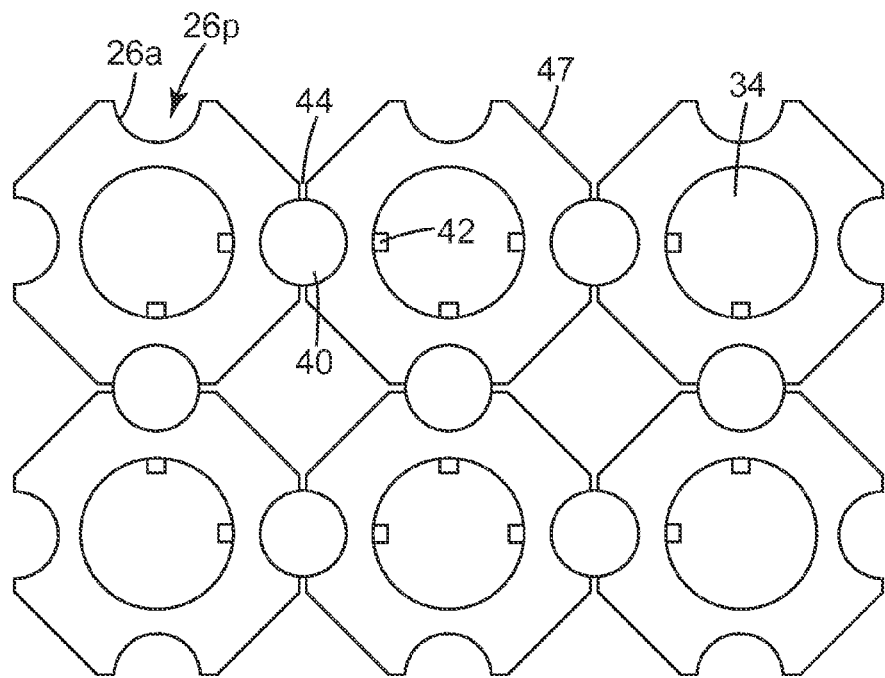
FIG. 3 is a side view of several alternative reconfigurable blocks having a square face, but with the precision alignment points positioned at the corners of the square, bound together.

Referring now to FIG. 3, a side view of several alternative reconfigurable blocks 47 bound together at their precision alignment points, e.g. 26p, is illustrated. Reconfigurable blocks 47 have a square face shape with two faces and four sides, but in contrast with reconfigurable blocks 20 of FIG. 1, the precision alignment points, e.g. 26p, are positioned at the corners of the square rather than along the edges. Some of the reconfigurable blocks 47 are bound together via shafts 40. The shafts 40 are held in the grooves 26a via, bolts 42. In this embodiment the grooves, e.g. 26a, have a truncated half-round shape, and the shaft is precision ground to a radius equal to the radius of the groove 26a so that adjacent reconfigurable blocks 47 are separated by a gap 44.

Figure 4:
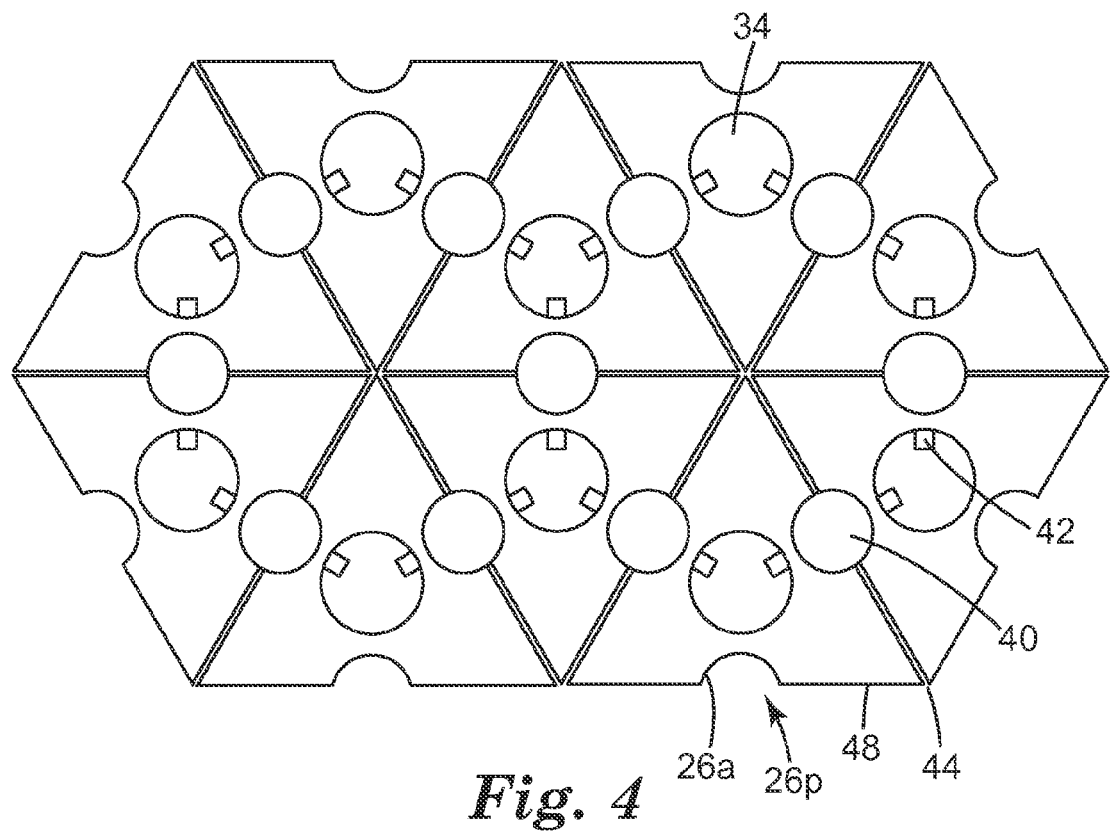
FIG. 4 is a side view of several reconfigurable blocks having a triangular face, bound together.

Referring now to FIG. 4, a side view of several alternative reconfigurable blocks 48 bound together at their precision alignment points, e.g. 26p, is illustrated. Reconfigurable blocks 48 have a triangular face shape with two faces and three sides, with the grooves 26a of the precision alignment points 26p, positioned at the centers of the triangle's edges. Some of the reconfigurable blocks 48 are bound together via shafts 40. The shafts 40 are held in the grooves 26a via, bolts 42. In this embodiment the grooves, e.g. 26a, have a truncated half-round shape, and the shaft is precision ground to a radius equal to the radius of the groove 26a so that adjacent reconfigurable blocks 47 are separated by a gap 44.

Figure 5:
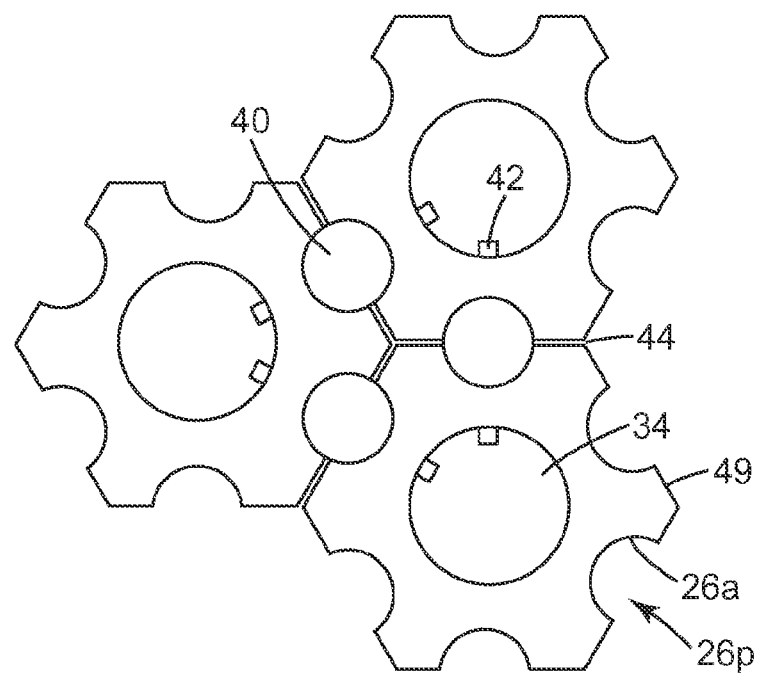
FIG. 5 is a side view of several reconfigurable blocks having a hexagonal face, bound together.

Referring now to FIG. 5, a side view of several alternative reconfigurable blocks 49 bound together at their precision alignment points, e.g. 26p, is illustrated. Reconfigurable blocks 49 have a hexagonal face shape with two faces and six sides, with the grooves 26a of the precision alignment points 26p, positioned at the centers of the hexagon's edges. Some of the reconfigurable blocks 49 are bound together via shafts 40. The shafts 40 are held in the grooves 26a via, bolts 42. In this embodiment the grooves, e.g. 26a, have a truncated half-round shape, and the shaft is precision ground to a radius equal to the radius of the groove 26a so that adjacent reconfigurable blocks 47 are separated by a gap 44.

The artisan will observe that the reconfigurable blocks of embodiments of FIGS. 1-5 have some degree of rotational symmetry. This is can be a great convenience with respect to flexibility in building up a web-handling machine frame, but is not considered a requirement of the invention. The thickness of the reconfigurable blocks is not critical as long as that thickness is sufficient to allow a firm placement for each reconfigurable block against an adjacent reconfigurable block, or against a shaft to align it as required. A thickness of approximately 1 inch (2.54 cm) is considered suitable for many embodiments. Thinner or thicker blocks can be used for other embodiments.

Figure 6:
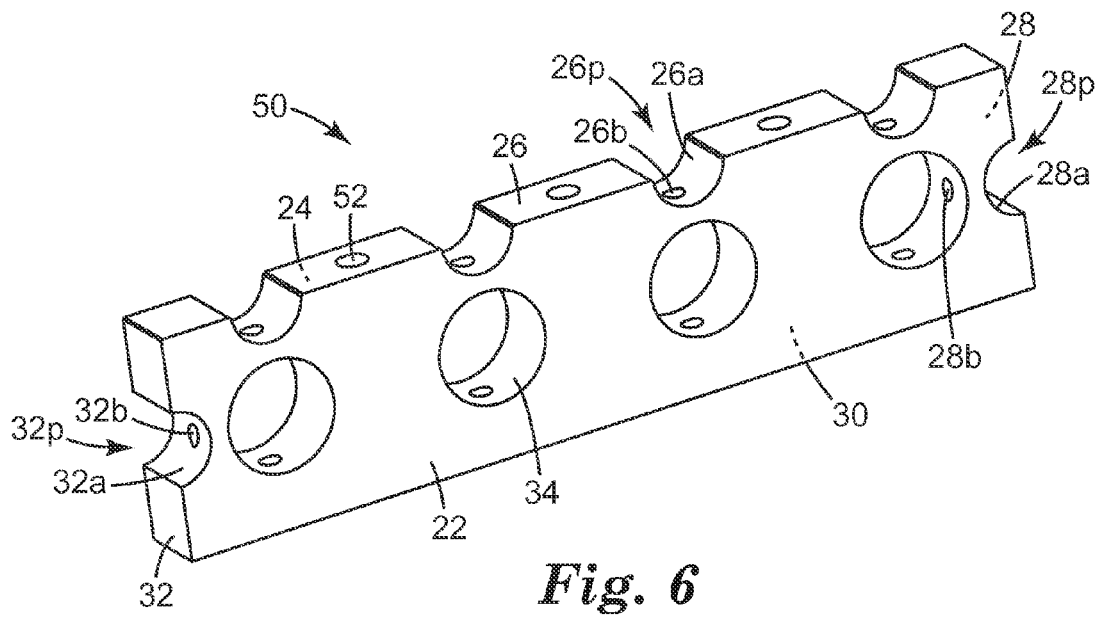
FIG. 6 is a perspective view of a specialized reconfigurable block suitable for binding a group of reconfigurable blocks to a solid base.

Referring now to FIG. 6, a perspective view of a specialized reconfigurable block 50 is illustrated. Reconfigurable block 50 is particularly suited to bind a group of reconfigurable blocks according to the invention to a fixed base such as a rail, optical breadboard, or base plate of a web-handling line. The reconfigurable block 50 has two rectangular faces 22 and 24, and in this embodiment four sides 26, 28, 30 and 32. Four bores 34 (typical) are present in face 22, and in this embodiment the bore 34 is a through bore that extends all the way to face 24.

In the depicted embodiment, only three sides 26, 28, and 32 have a precision alignment points 26p, 28p, and 32p respectively, each comprising a groove 26a, 28a, and 32a, and an aperture 26b, 28b, and 32b respectively, connecting one of the bores 34 to one of the grooves 26a, 28a, and 32a. Conveniently, each groove 26a, 28a, and 32a has a truncated half-round shape. Several counter-bored through holes 52 are present to allow bolts to be used to bind reconfigurable block 50 to a support base.

Web-handling lines are typically constructed of multiple stations which may be separated by distances on the order of meters but whose shaft-mounted web-contacting devices must nonetheless be in tram and level with each other. Referring now to FIG. 7, a perspective view of a web-handling station 60 is illustrated. Arbitrarily, for purposes of showing an assembly of reconfigurable blocks supporting actual web-handling apparatus, the web-handling station 60 being illustrated comprises a cantilevered unwind stand 62, a dancer roller assembly 64, and a pair of idler rollers 66 and 68. The web-handling station 60 includes not only unit sized blocks 20, but also larger reconfigurable blocks 70 and 72. Reconfigurable blocks 70 and 72 have more precision alignment points, e.g. 26*a*, than the unit blocks 20, but the spacing of these precision alignment points in the rectilinear grid previously discussed is the same predetermined value as the unit blocks 20 and accurate to the same degree.

The web-handling station 60 is shown assembled with a long tie shaft 74 (mounted in precision alignment points 26*p*) and a long tie shaft 76 (mounted in precision alignment points 30*p*), that span the distance between reconfigurable blocks 70 and 72. Another long tie shaft 78 spans the distance between unit sized reconfigurable blocks 20 mounted on reconfigurable block 70 and unit sized reconfigurable blocks 20 mounted on reconfigurable block 72. Short tie shafts 80 are also present in diverse locations to attach some of the unit sized reconfigurable blocks 20 together. The long tie shafts 74, 76, 78 and the short tie shafts 80 can be used to keep the reconfigurable blocks 20, 70, 72 in precise parallel alignment with each other.

Thus, a typical web-handling line or module made from the reconfigurable blocks will include two side frames generally made up from several reconfigurable blocks but each side frame could simply be one very large reconfigurable block for a small module. The web-handling line or module will also generally include short tie shafts or stub shafts that do not span from one side frame to the next but the join adjacent reconfigurable blocks, and long tie shafts that join the two side frames such that they are spaced parallel to each other at a predetermined distance. The spacing between the side frames is generally determined by the width of the web and the necessary clearance of the web to each of the side frames. Finally, the web-handling line or module generally includes one or more shaft mounted web-contacting devices and possibly one or more shaft mounted non-web contacting devices disposed in the precision alignment points of each side frame.

When web-handling station 60 is connected to another station employing the inventive reconfigurable blocks positioned before web-handling station 60 by one or more precision alignment points 32*p*, and connected to another station employing the inventive reconfigurable blocks positioned after web-handling station 60 by one or more precision alignment points 28*p*, any shaft-mounted web-contacting devices on the up-web and the down-web stations will be reliably in tram and level.

The unwind stand 62 includes a drive unit 90 for controlling the rotation of a spindle 92 that engages, e.g. the core of roll of indefinite length material. This illustrates that a web-handling element can be successfully mounted in a cantilevered fashion to one or more reconfigurable blocks (72 in this case). The dancer roller assembly 64 includes a dancer roller 94 rotatably mounted on swing arms 96 and 98 which are in turn pivotally mounted on a tie shaft 100. Tie shaft 100 is in turn positioned within precision alignment points 26*a* on reconfigurable blocks 70 and 72. Web tension controllers 102 and motion stops 104 of conventional type are present. This illustrates that a shaft-mounted web-contacting device such as dancer roller 94 can be placed in tram and level vicariously, in this case drawing on the precision placement of tie shaft 100 relative to reconfigurable blocks 70 and 72.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A web-handling machine frame, comprising:
   at least two reconfigurable interconnected blocks, and each of the at least two reconfigurable interconnected blocks comprising at least three sides and two faces, and
   at least one bore within at least one of the faces,
   at least two sides of each of the at least two reconfigurable interconnected blocks having a precision alignment point,
   each of the precision alignment points comprising an aperture connecting each of the alignment points to the bore;
   and at least one shaft, wherein the at least one shaft is disposed within and releasably attached to a corresponding one of the precision alignment points of each of the at least two reconfigurable interconnected blocks, wherein the at least two reconfigurable interconnected blocks are separated by a gap or wherein the at least one shaft is separated from the corresponding one of the precision alignment points of each of the at least two reconfigurable interconnected blocks by a gap.

2. A web-handling machine frame according to claim 1 wherein the positioning of at least some of the precision alignment points is such that the axis of the at least one shaft disposed within the corresponding precision alignment points is at the vertexes of a regularly spaced grid, with the vertexes spaced a predetermined distance, or a multiple of that predetermined distance, apart.

3. The web-handling machine frame according to claim 2 wherein the predetermined distance is accurate to within ±50 microns.

4. A web-handling machine frame according to claim 1 wherein the at least one shaft comprises a first shaft and a second shaft, the second shaft being disposed within and releasably attached to one of the precision alignment points of each of the at least two reconfigurable interconnected blocks such that the first and second shafts are parallel to within 0.004 radian.

5. A web-handling machine frame according to claim 1 wherein the bore is a through bore extending from one face to the other face.

6. A web-handling machine frame according to claim 1 wherein the at least one shaft has a cross section selected from the group consisting of round, triangular, or square.

7. A web-handling machine frame according to claim 1 wherein the precision alignment points include a groove having a half-round or truncated half-round shape.

8. A web-handling machine frame according to claim 7 wherein the shapes of the faces are rectilinear, save for the grooves.

9. A web-handling machine frame according to claim 8 wherein the shapes of the faces are square, wherein each side has one of the precision alignment points, and further wherein each of the precision alignment points is centered with respect to each side.

10. A web-handling machine frame according to claim 1 wherein at least one of the at least one shaft has at least one threaded hole and wherein the at least one of at least one shaft is held into at least one of the precision alignment points by a bolt, a shaft of the bolt disposed within the at least one threaded hole wherein a head is disposed within the bore.

11. A web-handling machine frame according to claim 7 wherein the shape of each of the grooves is a truncated half-round, and wherein the at least one shaft has a round cross section with a radius equal to the radius of each of the grooves, so that the edges of the at least two reconfigurable interconnected blocks are separated by a gap.

12. A web-handling machine frame according to claim 7 wherein the shape of each of the grooves is half-round, and wherein the at least one shaft makes a sliding fit with a corresponding one of the grooves so that the edges of the at least two reconfigurable interconnected blocks are in contact.

13. A web-handling machine frame according to claim 1 comprising at least four interconnected blocks, and at least two shafts, wherein each of the at least two shafts also supports a rotatable web contacting device.

14. A web-handling machine frame according to claim 13 wherein the at least two shafts are parallel to within 0.0001 radian.

15. A web-handling machine frame according to claim 1 comprising between about 2 to 500 reconfigurable interconnected blocks.

16. A web-handling machine frame, comprising:
at least two reconfigurable interconnected blocks wherein each of the at least two reconfigurable interconnected blocks has at least two precision alignment points; and
at least two shaft-mounted web-contacting devices each having an axis of rotation, the at least two shaft-mounted web-contacting devices each comprising at least one shaft;
wherein the at least one shaft of each of said web-contacting devices is positioned in one of the at least two precision alignment points of each of the at least two reconfigurable interconnected block, wherein each of the at least two reconfigurable interconnected blocks are separated by a gap or wherein the at least one shaft is separated from one of the at least two precision alignment points of each of the at least two reconfigurable interconnected blocks by a gap, and wherein the web-contacting devices are in tram and level to within 0.004 radian.

17. A web-handling machine frame according to claim 16 wherein the at least two reconfigurable interconnected blocks each have at least one face, and wherein the spacing of at least two of the precision alignment points in an x-y sense associated with one of the faces of one of the one of at least two reconfigurable interconnected blocks is a predetermined value.

18. The web-handling machine frame according to claim 17 wherein the predetermined value is accurate to within ±50 microns.

19. The web-handling machine frame according to claim 17 wherein the at least one face is square and the at least two precision alignment points are positioned along the side of the square.

20. The web-handling machine frame according to claim 17 wherein the at least one face is square and the at least two precision alignment points are positioned at the corners of the square.

21. A web-handling machine frame according to claim 16 wherein the at least two precision alignment points include a groove having a half-round or truncated half-round shape.

22. A web-handling machine frame according to claim 21 wherein the at least one shaft has a round cross section with a radius equal to the radius of the groove, so that the edges of the at least two reconfigurable interconnected blocks are separated by a gap.

23. A web-handling machine frame according to claim 16 comprising between about 2 to 500 reconfigurable interconnected blocks.

* * * * *